United States Patent [19]

Price

[11] 4,449,249

[45] May 15, 1984

[54] TELEVISON PROGRAMMING INFORMATION SYSTEM

[76] Inventor: Robert T. Price, 22515 Hartland St., Canoga Park, Calif. 91307

[21] Appl. No.: 423,708

[22] Filed: Sep. 27, 1982

[51] Int. Cl.³ .......................... H04B 1/00; H04B 1/70
[52] U.S. Cl. ....................................... 455/45; 370/11; 455/57; 455/228
[58] Field of Search ................. 455/3, 45, 53, 57, 102, 455/228, 205; 370/11, 71, 73; 358/116; 381/4, 14

[56] References Cited

U.S. PATENT DOCUMENTS

| | | | |
|---|---|---|---|
| 2,233,183 | 2/1941 | Roder | 370/11 |
| 2,776,429 | 1/1957 | Olerud | 370/11 |
| 3,534,266 | 10/1970 | Halstead | 455/54 |
| 3,922,607 | 11/1975 | Wysong | 455/45 |

*Primary Examiner*—Marc E. Bookbinder
*Attorney, Agent, or Firm*—Ralph B. Pastoriza

[57] ABSTRACT

Up to date television programming information along with a commercial is provided for a viewer of television independent of the viewer's television set. Such is accomplished by a radio either AM or FM which broadcasts first and second subcarrier signals carrying respectively a commercial and up to date television program information. The commercial and up to date television program information repeats after given set time periods, the later being updated every one-half hour. A viewer need only operate a specially designed radio receiver at a convenient location anytime he wishes to know which programs are coming up on his television set. The receiver is designed so that it will always play the broadcast commercial before the television program so that the system can be appropriately financed with no cost to the viewer.

4 Claims, 3 Drawing Figures

TELEVISON PROGRAMMING INFORMATION SYSTEM

FIELD OF THE INVENTION

This invention relates generally to communication systems and more particularly to a method and system of providing up to date television programming information to a viewer of television independent of the viewer's television set.

BACKGROUND OF THE INVENTION

Television programming information is normally provided a television viewer through the local newspapers or weekly TV magazine sections of Sunday papers. Also, such information is available from specially printed weekly magazines and often times from "flyers" produced by supermarkets and the like for promotional purposes.

While these media normally serve their purpose, there are some disadvantages. One such disadvantage is that most of the programming information is in fairly small print and middle-aged and elderly people usually need to hunt around for their glasses in order to read the same. Secondly, since the formats are usually made up at least a week in advance, there are often times changes so that the printed information is not always accurate. Finally, where each household has more then one television set, the normally available television programming information cannot always be quickly located.

Sometimes a television network, itself, will show on television for a brief period of time a summary of upcoming programs on that particular channel. However, the actual times at which such information is available are limited and unless one happens to turn on his television set at the proper time, he or she will miss this information.

BRIEF DESCRIPTION OF THE PRESENT INVENTION

With the foregoing considerations in mind, the present invention contemplates a novel method and system of providing up to date television programming information to a viewer of television, independent of the viewer's television set, and independent of any type of printed publication so that reading with or without eyeglasses is not necessary.

Briefly, the method involves the steps of transmitting by radio first and second sub-carrier signals along with a normal radio broadcast signal. The first sub-carrier signal contains a commercial which repeats at successive constant first time periods. The second sub-carrier signal contains upcoming television programs which repeats at successive constant second time periods. Also transmitted are synchronizing pulses at the beginning of the first time periods along with the first and second sub-carrier signals. A receiver is provided for receiving the normal radio broadcast signal, the first and second sub-carrier signals and the synchronizing pulses. Appropriate control means are provided so that in response to the synchronizing pulses, the first sub-carrier signal with the commercial is played followed by the second sub-carrier signal containing the upcoming television programs.

By means of the foregoing method and appropriate system for carrying out the method, a viewer can at will immediately determine upcoming television programs without having to hunt for his glasses or to search around for a printed publication such as a newspaper or magazine. Further, by locating the specially designed receiver where a viewer normally sits to view his television program, it is always immediately available for operation.

BRIEF DESCRIPTION OF THE DRAWINGS

A better understanding of this invention will be had by now referring to the accompanying drawings in which.

DETAILED DESCRIPTION OF THE INVENTION

Figure 1:
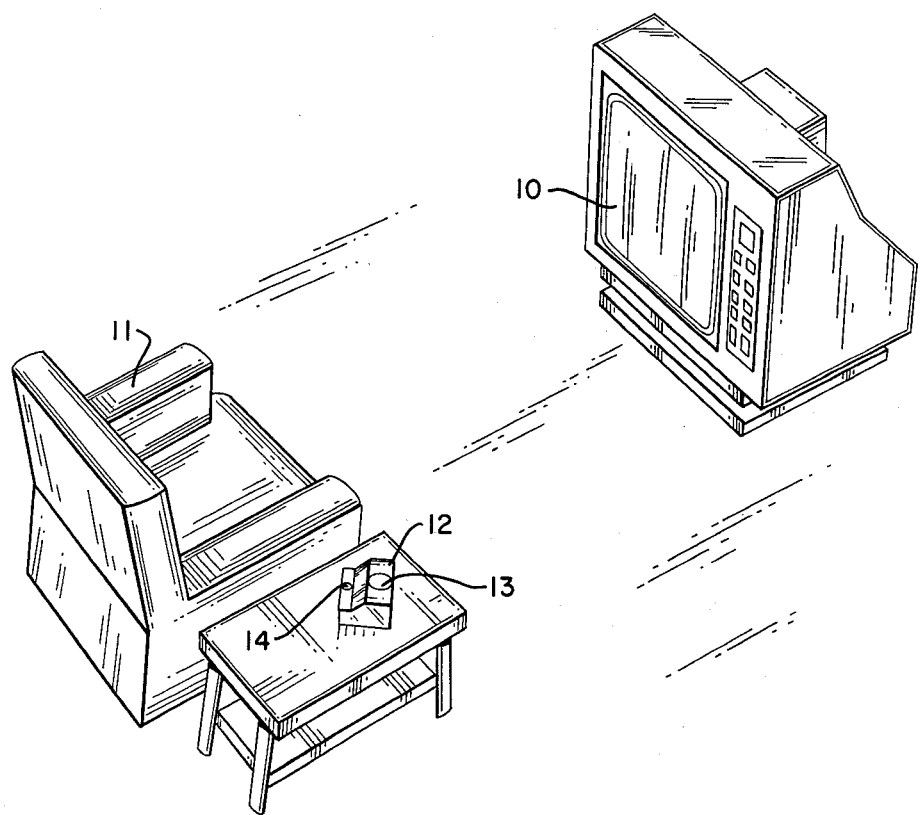
FIG. 1 is a perspective view of a television set and seating area for a viewer together with a schematic representation of a radio receiver in accord with the present invention.

Referring first to FIG. 1, there is shown a conventional television set 10 and seating area such as a lounge chair 11 for a viewer. Disposed on a table adjacent to the chair 11 is a radio receiver 12 having an aural reproduction means in the form of speaker 13 and an operating control button 14. Receiver 12 may be either an AM or FM receiver.

In accord with a feature of this invention, the receiver 12 of FIG. 1 is tuned to receive a signal AM station or FM station. In other words, it need not be designed to receive all of the available stations but only a selected station in the immediate area of the viewer's residence.

With respect to the foregoing, the AM or FM station in the area can pick up further business by providing the specific service to be described in accord with this invention; to wit, upcoming television information, periodically updated, for example, every thirty minutes. The service can pay for itself by also providing a commercial from the particular radio station in the area. A design of the receiver 12 is such that the commercial must always be heard prior to hearing any upcoming television programming information.

Figure 2:
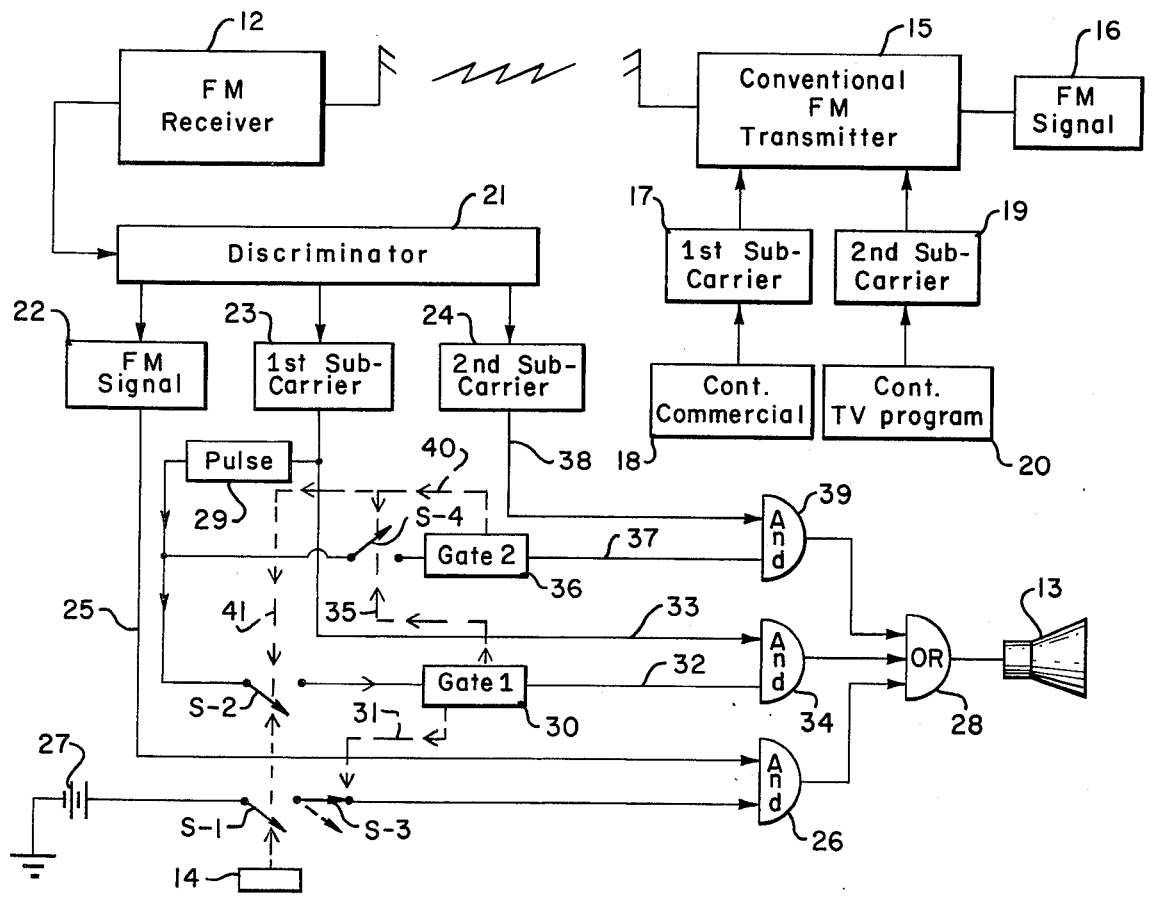
FIG. 2 is a block diagram useful in explaining the operation of the receiver of FIG. 1.

One example of the manner of carrying out the foregoing will best be understood by now referring to FIG. 2. Thus, referring first to the upper right portion of FIG. 2 there is represented by the block 15 a conventional FM transmittor. As mentioned, the station could be an AM station. If there are available both FM and AM stations, each could be provided with appropriate equipment in accord with the present invention to provide desired information to a television viewer. It will be understood that the viewer will have a receiver for either FM or AM or both depending upon the transmittor.

As shown in FIG. 2 by the block 16, the normal conventional FM signal is transmitted for the particular station in the local area along with a first sub-carrier represented by the block 17 modulated by a commercial represented by the block 18 and a second sub-carrier represented by the block 19 modulated by upcoming television program information represented by the block 20.

The commercial on the first sub-carrier is repeated at successive constant first time periods. Similarly, the upcoming television programs on the second sub-carrier repeat at successive constant second time periods.

Referring to the upper left portion of FIG. 2, there is shown the receiver 12, this receiver including a discriminator 21 for providing the normal FM broadcast audio signal, the demodulated first sub-carrier commercial, and the demodulated second sub-carrier television program information. These distinctive signals from the discriminator 21 are represented respectively by the blocks 22, 23 and 24.

As shown, the normal FM signal from the block 22 passes on the line 25 to a first AND circuit 26. An enabling signal from a battery 27 also connects into the AND circuit 26 through switch arms S-1 and S-3 when in closed positions. A switch arm S-1 is operated by pressing the button 14 on the receiver 12 described in FIG. 1. Operation of this button also closes a second switch arm S-2. The switch arm S-3 is normally closed as illustrated in solid lines in FIG. 2.

It will be seen that when the button 14 is operated, switch arm S-1 is closed to provide an enabling signal on the AND gate 26 to thereby pass any normally broadcast FM signal on the line 25 to an OR circuit 28 connecting to the speaker 13 for the receiver 12 described in FIG. 1.

As will become clearer as the description proceeds, the FM transmittor 15 in FIG. 2 also transmits synchronizing pulses at the beginning of the referred to first time period along with the commercial modulated the first sub-carrier signal. A pulse responsive block indicated at 29 passes the synchronizing pulses and after the switch arm S-2 is closed, the first of these pulses will enter a first gate generator 30. At this point, the same synchronizing pulse triggering the gate generator 30 operates to open up the switch arm S-3 as indicated by the dashed lines 31 to remove the enabling signal from the AND circuit 26 and thus remove the FM signal from the OR circuit 28.

The generation of the gate by the gate circuit 30 provides an enabling signal on a lead 32 which, enables the first sub-carrier signal from the block 23 on lead 33 to pass through an AND circuit 34 to the OR circuit 28. Thus, the commercial transmitted via the first sub-carrier is played through the speaker 13 in response to the first received synchronizing pulse in the gate generator 30.

At the end of the gate period corresponding to the length of the commercial, a synchronizing pulse passes from the gate generator 30 as indicated by the dash lines 35 to close a switch arm S-4 thereby connecting the synchronizing pulses to a second gate generator 36. This second gate generator 36 generates an enabling gate on output line 37 which, together with the television program information from the second sub-carrier provided on line 38 of block 24 passes through a third AND circuit 39 to the OR circuit 28 and speaker 13. Since the first generated gate in the gate circuit 30 is open at the end of the first gate period, the commercial is cut off and the programming information transmitted via the second sub-carrier is started so that it will then be heard through the speaker 13.

At the end of the second generating gate by the gate circuit 36, a signal is provided to open the switch arm S-4 as indicated by the dash line 40 and also to open the switch arms S-2 and S-1 as indicated by the dash line 41 and to close the switch arm S-3 so that the gates 30 and 36 will no longer receive synchronizing pulses and all of the switches will be in the initial positions they were prior to operation of a the switch button 14.

It can be seen from the foregoing that once the viewer of television operates the button 14, he will always first hear a commercial and then will receive the upcoming program information. The normal FM signal will be passed to the viewer during that period of time, if any, between the time the receiver is operated by the button 14 and the time that the first of the synchronizing pulses is received. For example, if the commercials run for exactly one minute; that is, if the first successive constant first time periods are each one minute, and should the viewer operate the button 14 halfway through a commercial, the viewer will only receive the normal FM signal broadcast until such time as a synchronizing pulse is received as described so that the viewer will always receive a complete commercial.

Figure 3:
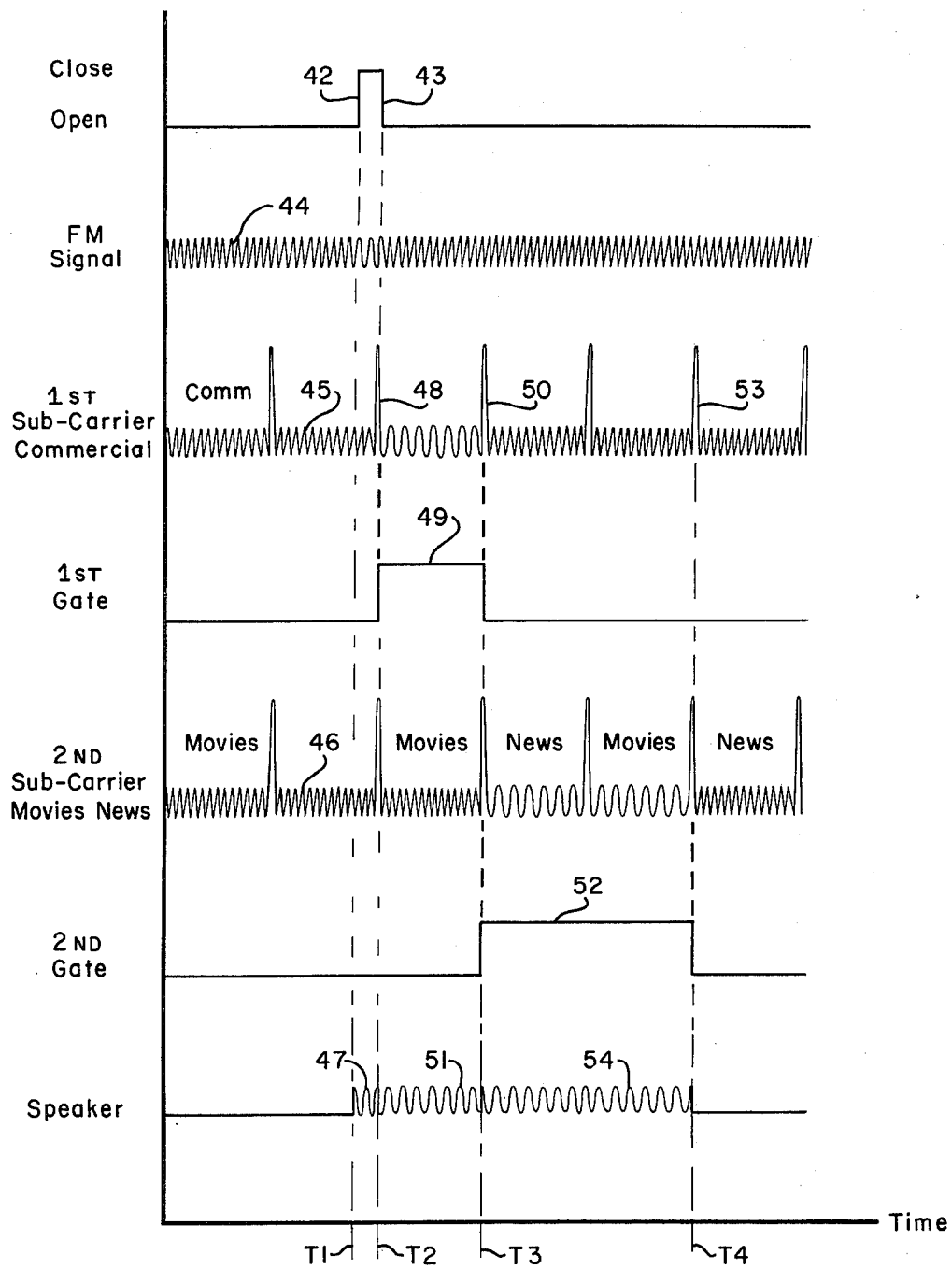
FIG. 3 is a signal diagram useful in explaining the operation of the block diagram of FIG. 2.

All of the above can be better understood by now referring to the various wave forms shown in FIG. 3 depicting the heretofore described operation.

Referring to the top portion, the lines 42 and 43 occurring at times T1 and T2 represent the duration of time when the switch arm S-1 is closed and the reception of a first synchronizing pulse through the switch arm S-2 to the first gate 30 of FIG. 2.

As mentioned heretofore, during this interval of time, the normal FM signal indicated at 44 in FIG. 3 will be passed to the viewer. The commercial signal transmitted via the first sub-carrier is indicated in the third diagram at 45 while the updated television program information transmitted via the second sub-carrier is indicated at 46.

In the bottom diagram of FIG. 3 there is indicated a signal that will come from the receiver speaker. Thus, there will initially be played to the viewer the FM signal between the times T1 and T2 indicated at 47. At the time T2, the first of the various synchronizing pulses indicated at 48 in the third diagram for the first sub-carrier commercial is received. This signal 48 as described with respect to FIG. 2 initiates the generation of the first gate shown at 49. Gate 49 provides the enabling circuit to the AND circuit 34 described in FIG. 2 for the exact duration of the commercial which might, for example, be one minute. This gate period corresponds to the period between successive synchronizing pulses. At the end of the first gate 49, the switch arm S-4 is closed by the dash line 35 as described in FIG. 2 so that the next pulse 50 will pass to the gate generator 36. This same pulse 50 demarks the end of the commercial period and because of the end of the first gate 49, the enabling signal is removed from the AND circuit 34 of FIG. 2 so that the commercial portion encompassed between the synchronizing pulses 48 and 50 only will be passed to the speaker. This commercial signal is indicated at 51 in the lower diagram of FIG. 3.

When the synchronizing pulse 50 is received in the second gate circuit 36 described in FIG. 2 as a consequence of closure of the switch arm S-4, the second gate will be initiated and this second gate is indicated at 52 in FIG. 3. This gate will last for the second period for the upcoming television information and as a matter of convenience, this information can best be divided into two segments constituting by way of example a news segment and a movie segment. Each of these segments might be one minute long corresponding to the length of the commercial, the overall television information totalling two minutes. By this arrangement, either the news will first be heard followed by the movies or the movies will first be heard followed by the news depending upon the exact time that the viewer should initate operation on the receiver. However, regardless of the time that the receiver is operated, the viewer will always hear the one minute commercial first.

After completion of the second gate 52 which is designed to last exactly two minutes; that is, a length of time corresponding to the upcoming television program information, the gate 52 will terminate at time T4 corresponding to synchronizing pulse 53 and the upcoming television information will have been passed to the speaker as indicated at 54 in FIG. 3.

From all of the foregoing, it will be seen that the pulse detector 29 in FIG. 2 together with the gates and the AND and OR circuits constitute essentially a control means responsive to the broadcast synchronizing pulses, the commercial and the television program information for assuring that when the radio receiver is operated by a viewer, the receiver will always play the commercial information modulated on the first sub-carrier prior to playing the television programming information modulated on the second sub-carrier signal.

While a specific embodiment of this invention has been described respecting the block diagram of FIG. 2 and the wave forms of FIG. 3, it should be understood that the same is merely one example of the present method and system of this invention and the invention is not to be thought of as limited to this specific example.

I claim:

1. A method of providing up to date television programming information together with a commercial to a viewer of television, independent of the viewer's television set, including the steps of:
   (a) transmitting a radio frequency carrier modulated by first and second sub-carrier signals along with a normal radio broadcast signal, said first sub-carrier signal being further modulated by said commercial which repeats at successive constant first time periods, said second sub-carrier signal being further modulated by upcoming television program information which repeats at successive constant second time periods;
   (b) transmitting synchronizing pulses at the beginning of said first time periods modulated along with said commercial on said first sub-carrier signal;
   (c) receiving and processing modulated radio frequency carrier at a receiver to provide said normal radio broadcast signal, said commercial and television program information and said synchronizing pulses; and
   (d) playing said commercial and television program information under control of said synchronizing pulses so that said viewer always hears first said commercial and second said upcoming television program information whenever said viewer operates said receiver to receive such information.

2. The method of claim 1 including the step of passing said normal radio broadcast signal to said viewer during a time period, if any, between the time the radio receiver is operated by the viewer and the time of provision of the first of said synchronizing pulses.

3. A radio receiving device for aurally reproducing up to date television programming information together with a commercial to a viewer of television, independent of the viewer's television set, including, in combination:
   (a) aural reproduction means
   (b) a radio signal receiver discriminating means for deriving synchronizing pulses along with said commercial from a first broadcast sub-carrier signal and for deriving up to date television program information from a second broadcast sub-carrier signal; and
   (c) control means coupled between said discriminating means and said aural reproduction means responsive to said synchronizing pulses for assuring that whenever said radio receiver is operated by a viewer for listening to program information, said commercial is coupled to said aural reproduction means before said television program information.

4. A device according to claim 3, in which said discriminating and control means enable aural reproduction of a normal broadcast signal derived from a receiver radio signal receiver during a time period, if any, between the time the radio receiver is operated to the time of the first provided of said synchronizing pulses.

* * * * *